(12) United States Patent
Chang et al.

(10) Patent No.: US 9,875,191 B2
(45) Date of Patent: Jan. 23, 2018

(54) ELECTRONIC DEVICE HAVING SCRATCHPAD MEMORY AND MANAGEMENT METHOD FOR SCRATCHPAD MEMORY

(71) Applicant: NATIONAL CHENG KUNG UNIVERSITY, Tainan (TW)

(72) Inventors: Ta-Wei Chang, Tainan (TW); Ing-Chao Lin, Tainan (TW); Wen-Yu Su, Tainan (TW); Yu-Shiang Chien, Tianan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 53 days.

(21) Appl. No.: 14/940,486

(22) Filed: Nov. 13, 2015

(65) Prior Publication Data
US 2016/0342526 A1 Nov. 24, 2016

(30) Foreign Application Priority Data

May 18, 2015 (TW) .............................. 104115743 A

(51) Int. Cl.
*G06F 12/1045* (2016.01)
*G06F 12/0802* (2016.01)

(52) U.S. Cl.
CPC ...... *G06F 12/1063* (2013.01); *G06F 12/0802* (2013.01); *G06F 2212/1021* (2013.01); *G06F 2212/60* (2013.01); *G06F 2212/684* (2013.01)

(58) Field of Classification Search
CPC ............. G06F 12/1063; G06F 12/0802; G06F 2212/1021; G06F 2212/60; G06F 2212/684; Y02B 60/1225
See application file for complete search history.

(56) References Cited

U.S. PATENT DOCUMENTS 5,768,500 A * 6/1998 Agrawal ............... G06F 11/348
714/47.2
5,893,144 A * 4/1999 Wood ................... G06F 12/0811
711/118

(Continued)

FOREIGN PATENT DOCUMENTS

| TW | I439857 | 6/2014 |
| TW | I450194 | 8/2014 |
| WO | 2014105163 A1 | 7/2014 |

OTHER PUBLICATIONS

Banakar R. et al., Scratchpad memory: a design alternative for cache on-chip memory in embedded systems, Proceedings of the Tenth International Symposium on Hardware/Software Codesign. CODES 2002 (IEEE Cat. No. 02TH8627), Estes Park, CO, USA, 2002, pp. 73-78.<URL: http://ieeexplore.ieee.org/stamp/stamp.jsp?tp=&arnumber=1003604&isnumber=21667>.*

(Continued)

*Primary Examiner* — David Yi
*Assistant Examiner* — Nicholas A. Paperno
(74) *Attorney, Agent, or Firm* — McClure, Qualey & Rodack, LLP

(57) ABSTRACT

An electronic device having a scratchpad memory and a management method are provided. A recording circuit records multiple counter values which correspond to entries in a Translation Lookaside Buffer (TLB). A virtual address is matched with a first entry. If a cache miss occurs, the recording circuit updates a first counter value corresponding to the first entry, and determines if the first counter value meets a threshold criterion. If the first counter value meets the threshold criterion, the recording circuit transmits an interrupts signal to a processing unit, and the processing unit (Continued)

moves data into the scratchpad memory. If the first counter value does not meet the threshold criterion, the data is moved into a cache.

7 Claims, 7 Drawing Sheets

(56) References Cited

U.S. PATENT DOCUMENTS

| | | | |
|---|---|---|---|
| 5,893,159 A | 4/1999 | Schneider | |
| 5,950,205 A * | 9/1999 | Aviani, Jr. | G06F 12/123 |
| 6,434,608 B1 * | 8/2002 | Desai | H04L 67/2852 |
| | | | 709/203 |
| 7,330,937 B2 | 2/2008 | Chauvel et al. | |
| 7,461,210 B1 * | 12/2008 | Wentzlaff | G06F 12/126 |
| | | | 711/120 |
| 8,131,977 B2 | 3/2012 | Yasufuku | |
| 8,522,072 B2 | 8/2013 | Huang | |
| 8,788,800 B2 | 7/2014 | Huang et al. | |
| 2006/0026384 A1 * | 2/2006 | Brandt | G06F 9/4843 |
| | | | 711/209 |
| 2006/0083268 A1 * | 4/2006 | Holaday | G01R 31/3177 |
| | | | 370/509 |
| 2011/0016285 A1 | 1/2011 | Lee et al. | |
| 2014/0013020 A1 * | 1/2014 | Horsnell | G06F 13/24 |
| | | | 710/260 |
| 2014/0095775 A1 * | 4/2014 | Talagala | G06F 12/0866 |
| | | | 711/103 |
| 2014/0189247 A1 | 7/2014 | Hughes et al. | |

OTHER PUBLICATIONS

Da-Wei Chang et al., "CASA: Contention-Aware Scratchpad Memory Allocation for Online Hybrid On-Chip Memory Management," IEEE, vol. 33, No. 12, Dec. 2014.

Yu-Shiang Chien, "Design of a Contention-Aware Hybrid On-Chip Memory Management Mechanism," A thesis submitted to the graduate division in partial fulfillment of requirements for degree of master in Institute of Computer Science and Information Engineering, Nation Cheng Kung University, Tainan, Taiwan, R.O.C., Jul. 2013.

* cited by examiner

1: $MA_{pre} = 0$; $MA_{cur} = 0$; $Th_{cur} = 64$; $Th_{next} = 128$;
      // initialize $MA_{pre}$,
      // $MA_{cur}$, $Th_{cur}$, and $Th_{next}$
2: When the timer interrupt is triggered
3:     $MA_{pre} = MA_{cur}$, $Th_{pre} = Th_{cur}$, $Th_{cur} = Th_{next}$;
4:     $MA_{cur}$ = number of off-chip memory accesses (in cache blocks) in current period;
5:     if ($P_{cur} <= 0$ and SPM has free space) then
6:         $Th_{next} = Th_{cur}/2$; goto line 14;
7:     if ($MA_{cur} < MA_{pre}$) then
8:         if ($Th_{cur} > Th_{pre}$) then
9:             $Th_{next} = Th_{cur}*2$;
10:        else
11:            $Th_{next} = Th_{cur}/2$;
12:    else
13:        $Th_{next} = Th_{pre}$;
14:    reset counters
15:    wait for the next timer interrupt and goto line 2;

FIG. 6

ELECTRONIC DEVICE HAVING SCRATCHPAD MEMORY AND MANAGEMENT METHOD FOR SCRATCHPAD MEMORY

RELATED APPLICATIONS

This application claims priority to Taiwan Application Serial Number 104115743 filed May 18, 2015, which is herein incorporated by reference.

BACKGROUND

Field of Invention

The present invention relates to scratchpad memory. More particularly, the present invention relates to a hybrid memory architecture with scratchpad memory and cache.

Description of Related Art

Some studies have found that the memory subsystem to be responsible for 50% to 75% of the total chip power consumption of a system. A conventional cache has a data memory and a tag memory, but the tag memory cost a lot of power. FIG. 1 is a diagram illustrating a conventional scratchpad memory. Referring to FIG. 1, a scratchpad memory 200 includes a row multiplier 210, a data memory 220, a row multiplier 222, a sense amplifier 224 and an output driver 226, but the scratchpad memory 200 does not include the tag memory. There are several differences between the cache and the scratchpad memory. First, the scratchpad memory has less power consumption because it does not have the tag memory and comparators. Second, the scratchpad memory has its own address space, but the cache does not. Third, the scratchpad memory is just a plain memory, and software is necessary to determine whether data should be moved into it. FIG. 2 is a diagram illustrating a hybrid memory architecture. Referring to FIG. 2, a chip 310 includes a processing unit 311, a redirector 312, a scratchpad memory 313 and a cache 314, and a dynamic random access memory (DRAM) 320 is disposed outside the chip 310. When the processing unit 311 transmits a memory address to the redirector 312, the redirector 312 determines whether the memory address belongs to the address space of the scratchpad memory 313. If the memory address belongs to the address space of the scratchpad memory 313, the redirector 312 will transmit the memory address to the scratchpad memory 313, and otherwise to the cache 314. However, the processing unit 311 must decide which data is moved to the scratchpad memory 313. One conventional approach is to move frequently accessed data to the scratchpad memory 313 in order to reduce the total power consumption. However, people skilled in the art are still searching for a better solution.

SUMMARY

The present invention provides an electronic device including a processing unit, a translation lookaside buffer (TLB), a redirector, a scratchpad memory, a cache and a recording circuit. The TLB is coupled to the processing unit and has a plurality of entries. The TLB receives a virtual address from the processing unit, and the virtual address is matched with a first entry of the entries. The TLB outputs a physical address according to the virtual address and a physical page number recorded in the first entry. The redirector is coupled to the TLB and receives the physical address. The scratchpad memory is coupled to the redirector. The cache is coupled to the redirector. The recording circuit is coupled to the TLB, the cache and the processing unit. The recording circuit records a plurality of count values which are respectively corresponding to the entries. The redirector transmits the physical address to the scratchpad memory or the cache. If a cache miss occurs when the physical address is transmitted to the cache, the recording circuit updates a first count value of the count values corresponding to the first entry, and determines whether the first count value meets a threshold criterion. If the first count value meets the threshold criterion, the recording circuit transmits an interrupt signal to the processing unit, and the processing unit moves data corresponding to the physical address to the scratchpad memory. If the first count value does not meet the threshold criterion, the data corresponding to the physical address is moved to the cache.

Embodiments of the present invention provides a method for managing an electronic device including a processing unit, a translation lookaside buffer (TLB), a redirector, a scratchpad memory and a cache. The TLB has multiple entries, and a virtual address from the processing unit is matched with a first entry of the entries. The TLB outputs a physical address according to the virtual address and a physical page number recorded in the first entry. The redirector transmits the physical address to the scratchpad memory or the cache. The method includes: recording multiple count values which are respectively corresponding to the entries; if a cache miss occurs when the physical address is transmitted to the cache, updating a first count value of the count values corresponding to the first entry, and determining whether the first count value meets a threshold criterion; moving data corresponding to the physical address to the scratchpad memory if the first count value meets the threshold criterion; and moving the data corresponding to the physical address to the cache if the first count value does not meet the threshold criterion.

BRIEF DESCRIPTION OF THE DRAWINGS

The invention can be more fully understood by reading the following detailed description of the embodiment, with reference made to the accompanying drawings as follows:

FIG. 6 is diagram illustrating pseudo codes implementing a threshold adjustment procedure according to an embodiment.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to a particular order or sequence. In addition, the "couple" used in the specification should be understood for electrically connecting two units directly or indirectly. In other words, when "a first object is coupled to a second object" is written in the specification, it means another object may be disposed between the first object and the second object.

Figure 2:
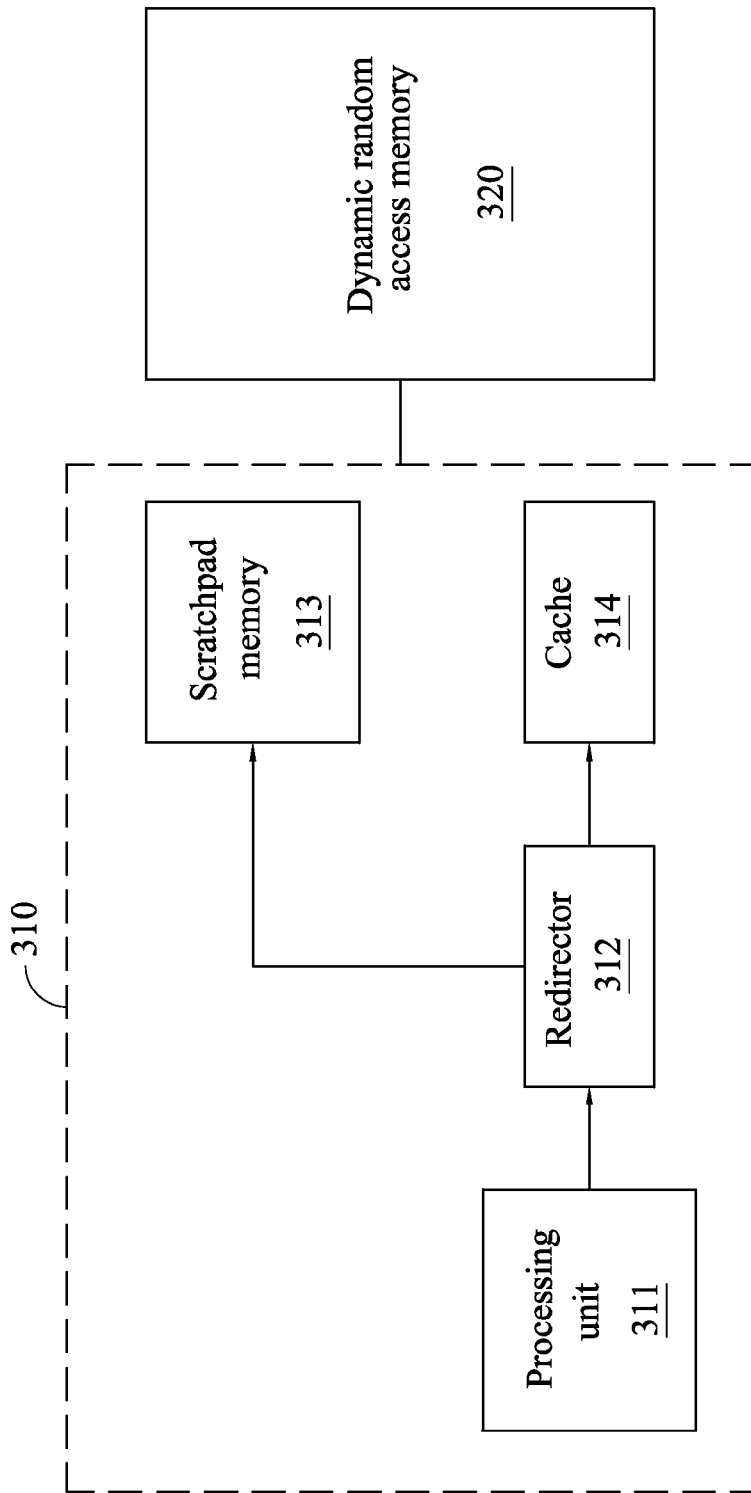
FIG. 2 is a diagram illustrating a hybrid memory architecture.

In the memory architecture of FIG. 2, frequently accessed data is moved to the scratchpad memory 313. However, this approach cannot reduce accesses to the DRAM 320, and may be due to following reasons. First, before the data is moved to the scratchpad memory 313, the data may be stored in the cache 314 and the hit rate of the cache 314 may be high. Therefore, moving the data to the scratchpad memory 313 does not significantly reduce the number of the DRAM 320 access. Second, due to the limited size of the scratchpad memory 313, the data causing cache misses may not be moved into the scratchpad memory 313 because they may not have sufficient access frequencies.

Generally, cache misses can be divided into three categories which are compulsory miss, conflict miss and capacity miss. The compulsory miss is caused by the initial data access, and the other two types are caused when data are contending for cache lines. Since the cache miss is a major reason for the DRAM 320 access, in the embodiment, the cache miss is used to determine which data is moved to the scratchpad memory in order to reduce the DRAM 320 access.

Figure 3:
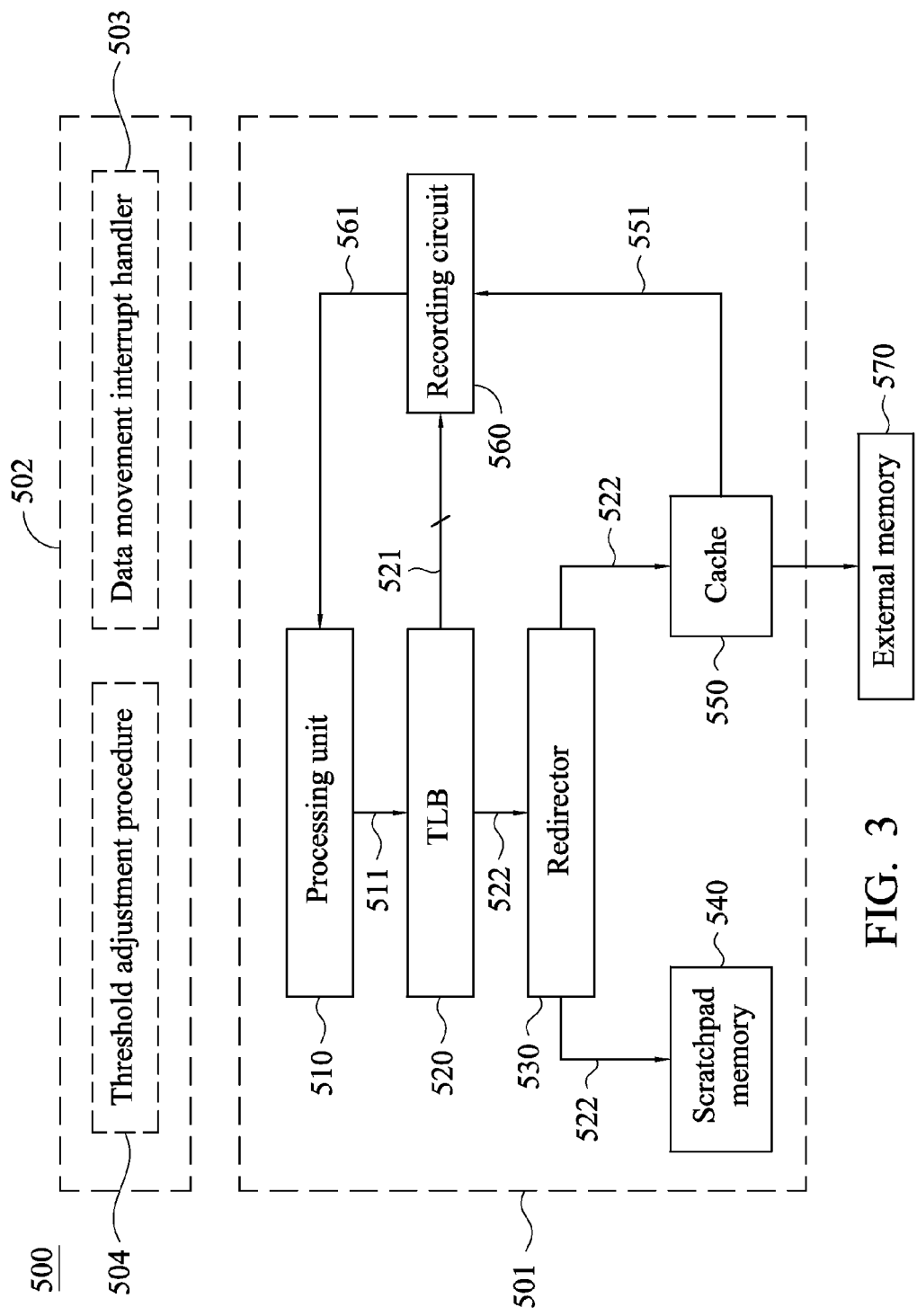
FIG. 3 is a schematic circuit diagram illustrating an electronic device.

FIG. 3 is a schematic circuit diagram illustrating an electronic device. Referring to FIG. 3, an electronic device 500 may be implemented as a cell phone, a tablet, a laptop, or any types of embedded system. Alternatively, the electronic device 500 may be implemented as a circuit board, a chip, etc. The invention does not limit whether the electronic device 500 is a business-to-customer product or a business-to-business product. In the embodiment, the electronic device 500 includes a processing unit 510, a translation lookaside buffer (TLB) 520, a redirector 530, a scratchpad memory 540, a cache 550 and a recording circuit 560 in a chip 501. In some embodiments, the electronic device 500 also includes an external memory 570 outside the chip 501. In other embodiments, the external memory 570 may be disposed inside the chip 501, which is not limited in the invention. In the embodiment, the external memory 570 is, for example, a dynamic random access memory.

In some embodiments, the electronic device 500 also has software 502. The software 502 at least includes a data movement interrupt handler 503 and a threshold adjustment procedure 504. The software 502 may be loaded into the external memory 570, and executed by the processing unit 510. Details of the data movement interrupt handler 503 and the threshold adjustment procedure 504 will be described below.

In the embodiment, the processing unit 510 is a central processing unit. However, the processing unit 510 may be a graphic processing unit, a microprocessor, or a circuit capable of executing instructions in other embodiments. When the processing unit 510 executes an instruction (e.g. "Store" or "Load" instruction) to access the memory, it sends a virtual address 511 to the TLB 520. However, the store or load instruction is just an example, and the invention does not limit the instruction set used by the processing unit 510.

Figure 4:
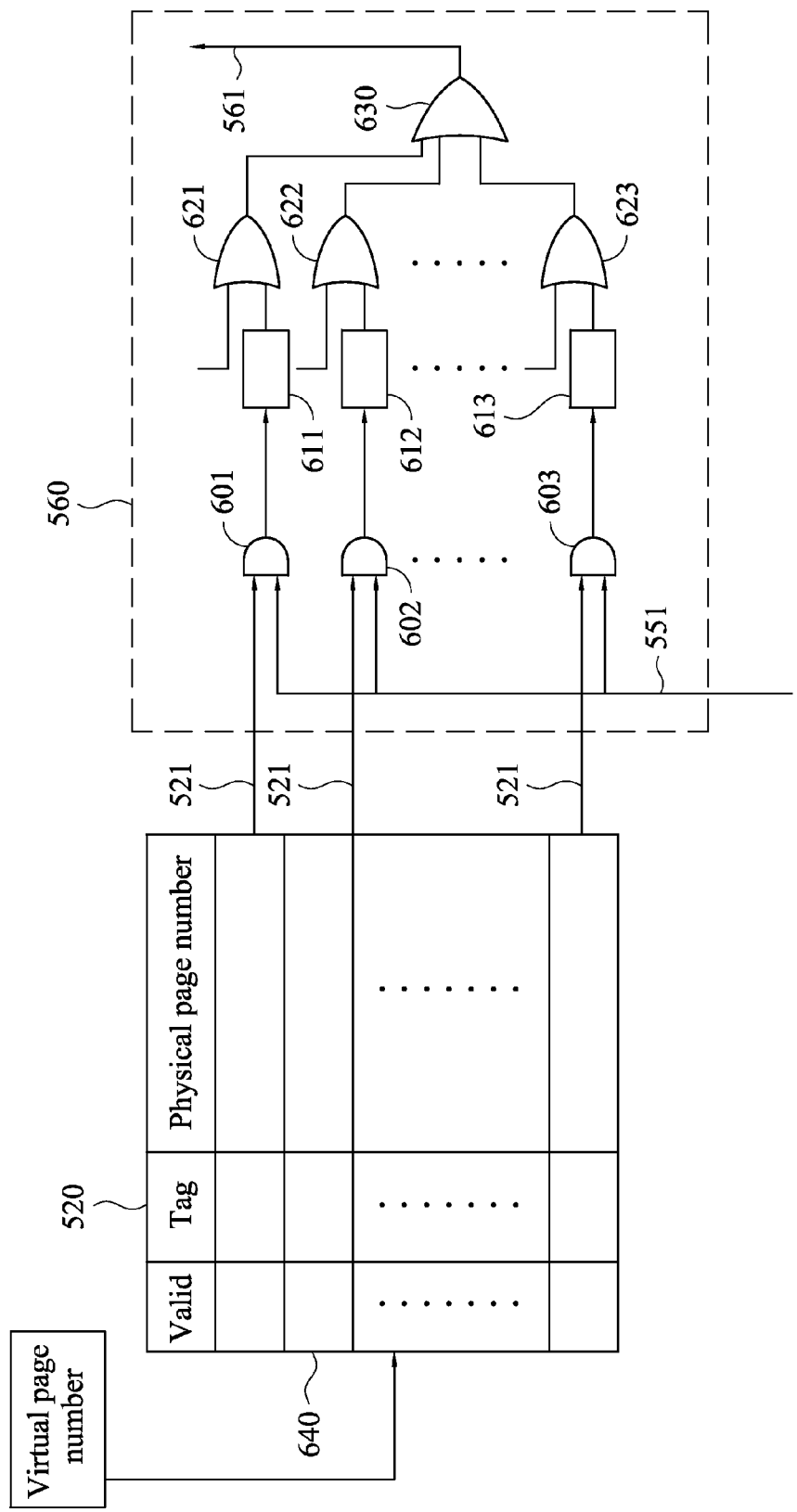
FIG. 4 is a schematic diagram illustrating a TLB 520 and a recording circuit 560.

FIG. 4 is a schematic diagram illustrating the TLB 520 and the recording circuit 560. Referring to FIG. 3 and FIG. 4 together, the TLB 520 is coupled to the processing unit 510 and has multiple entries. Each entry at least includes a valid column, a tag column and a physical page column. The valid column records a bit indicating whether the corresponding entry is valid, the tag column records a tag, and the physical page column records a physical page number (PPN). After receiving the virtual address 511, the TLB 520, for example, takes several bits in the virtual address 511 as a virtual page number, and finds one (herein referred to a first entry 640) of the entries according to the virtual page number. Some other bits in the virtual address 511 are taken as a tag to be compared with a tag in the first entry 640. If the tag in the virtual address 511 is the same with the tag in the first entry 640, it is called that the virtual address 511 is matched with the first entry 640. Then, the TLB 520 generates a physical address 522 according to the virtual address 511 and the physical page number recorded in the first entry 640, and the physical address 522 will be transmitted to the redirector 530. However, people skilled in the art should understand the match operation and the operation of generating the physical address, and these operations may have variants if different architectures are used, which are not limited in the invention. In particular, the TLB 520 transmits multiple match signals 521 to the recording circuit 560, and the match signals 521 are used to indicate which entry is matched. For example, the match signal 521 corresponding to the first entry 640 is logical "1", and the others are logical "0".

Referring to FIG. 3 again, the redirector 530 is coupled to the TLB 520 and configured to receive the physical address 522. The redirector 530 determines whether the physical address 522 belongs to an address space of the scratchpad memory 540. If the physical address 522 belongs to the address space of the scratchpad memory 540, then the redirector 530 transmits the physical address 522 to the scratchpad memory 540 in order to access the data therein, otherwise the physical address 522 is transmitted to the cache 550.

Figure 1:
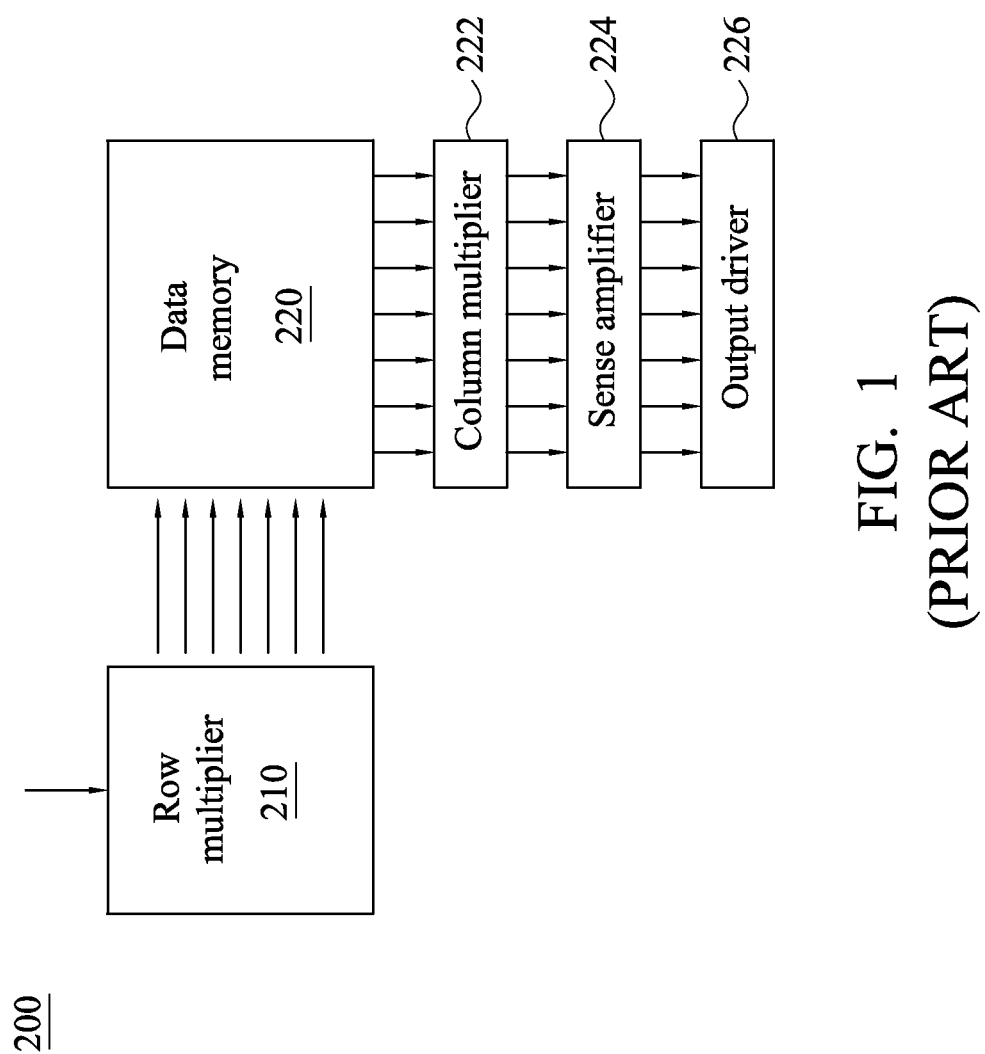
FIG. 1 is a diagram illustrating a conventional scratchpad memory.

The scratchpad memory 540 is coupled to the redirector 530, and the structure of the scratchpad memory 540 is similar or the same with the scratchpad memory 200 shown in FIG. 1. The cache 550 is also coupled to the redirector 530, and the structure thereof may be N-way association, where N may be 1, 2, 4, 8 or another suitable positive integer. The invention does not limit sizes of the scratchpad memory 540 and the cache 550. In the embodiment, the scratchpad memory 540 and the cache 550 are, for example, static random access memories, but the invention is not limited thereto.

If a cache miss occurs when the physical address 522 is transmitted to the cache 550, it means that the data corresponding to the physical address 522 is not in the cache 550, and the data has to be obtained from the external memory 570 and moved into the cache 550 or the scratchpad memory 540. Note that the hierarchy relationship between the cache 550 and the external memory 570 in FIG. 3 is just an example. In other embodiments, the electronic device 500 may have more levels of caches. Alternatively, the external memory 570 may be coupled to another memory (e.g. a flash memory or a hard disk), and when the cache miss occurs, the data corresponding to the physical address 522 may be moved from the flash memory or the hard disk to the external memory 570, and then moved to the cache 550 or the scratchpad memory 540.

The recording circuit 560 is coupled to the TLB 520, the cache 550 and the processing unit 510. The recording circuit 560 records multiple count values which are respectively corresponding to the entries of the TLB 520. It will be described below about how to determine which data is moved to the scratchpad memory 540 according to the count values.

If the cache miss occurs when the physical address 522 is transmitted to the cache 550, the cache 550 transmits a cache miss signal 551 to the recording circuit 560. After receiving the cache miss signal 551, the recording circuit 560 finds the count value (also referred to a first count value) corresponding to the aforementioned first entry according to the match signal 521. The recording circuit 560 updates the first count value, and determines whether the first count value meets a threshold criterion. For example, every time the recording circuit 560 updates the first count value, the first count value is increased (e.g. plus one), and the recording circuit 560 determines whether the first count value is greater than a threshold. If the first count value is greater than the threshold, it represents that the first count value meets the threshold criterion. However, in other embodiments, every time the recording circuit 560 updates the first count value, the first count value may also minus one, and the recording circuit 560 may determine whether the first count value is less than another threshold to determine whether the threshold criterion is met. Alternatively, the recording circuit 560 may determine whether the first count value is in a specific value range to determine whether the threshold criterion is met. The invention does not limit how the count values are updated and does not limit the content of the threshold criterion.

If the first count value meets the threshold criterion, it means that lots of cache misses have occurred in a physical page corresponding to the first entry, and in this case, the recording circuit 560 will transmit an interrupt signal 561 to the processing unit 510. Then, the processing unit 510 executes a data movement interrupt handler 503 to move the data corresponding to the physical address 522 to the scratchpad memory 540. In the contrary, if the first count value does not meet the threshold criterion, the data corresponding to the physical address 522 is moved to the cache 550 (may be done by the cache 550 or another circuit). In other words, according to the count values, the data where the cache misses occur most frequently is moved into the scratchpad memory 540.

In the embodiment, a size of the data corresponding to the physical address 522 is the same with a size of a page when the data is moved from the external memory 570 to the scratchpad memory 540. On the other hand, the size of the data corresponding to the physical address 522 is the same with a size of one or more cache lines when the data is moved from the external memory 570 to the cache 550. To be specific, the physical address 522 belongs to a certain physical page, and the processing unit 510 moves all the data in the physical page into the scratchpad memory 540, or moves the data in the one or more cache lines corresponding to the physical address 522 into the cache. However, in other embodiments, the size of the data corresponding to the physical address 522 may be the same with a size of one or more cache lines when the data is moved to the scratchpad memory 540. For example, in the physical page which the physical address 522 belongs to, the processing unit 510 may move the data located near the physical address 522 into the scratchpad memory 540, and the size of the moved data is the same with the size of one or more cache lines.

In the embodiment, each count value is corresponding to one entry of the TLB 520; each entry is corresponding to one page, and one of the count value is updated when the cache miss occurs. Therefore, each count value means a number of times of cache misses occurred in the corresponding page. Note that the count values are corresponding to the entries of the TLB 520 instead of the total number of pages in a program, and there are several reasons for this design. First, without profiling, the number of pages in a program is unknown, and thus the required number of counters is unknown. Second, even if the number of pages in a program can be obtained, the number may be large and may be different for each program. Therefore, adding a counter for each page will incur a significant hardware cost. In contrast, the number of the entries of the TLB 520 is fixed and relatively small, and therefore the complexity of the recording circuit 560 can be reduced in the embodiment.

Since each entry of the TLB 520 is corresponding to a certain program and a certain virtual page, if a TLB miss occurs on one of the entries, the corresponding count value will lose its meaning. Therefore, in some embodiments, the recording circuit 560 resets the count value which is corresponding to the entry having the TLB miss. In some embodiment, if a context switch occurs in the processing unit 510, the recording circuit 560 will reset all of the count values. However, if a tagged TLB is used (the TLB has process identifiers or address space identifiers), then only the count values corresponding to the entries which are invalid or replaced will be reset.

In the embodiment of FIG. 4, the recording circuit 560 includes AND gates 601~603, counters 611~613, comparators 621~623 and an OR gate 630. Each AND gate 601~603 has a first input terminal coupled to one of the entries in the TLB 520 to receive the corresponding match signal 521, and has a second input terminal receiving the cache miss signal 551 from the cache 550. In the embodiment, when the virtual address is matched with the first entry 640, the match signal 521 corresponding to the first entry 640 is logical "1", and the other match signals 521 are logical "0". When the cache miss occurs in the cache 550, the cache miss signal 551 is logical "1". The match signal 521 and the cache miss signal 551 is ANDed. The counters 611~613 are respectively coupled to output terminals of the AND gates 601~603, and the counters 611~613 respectively record the aforementioned count values. When one of the AND gates 601~603 outputs logical "1", the corresponding counter is triggered to update the count value. The comparators 621~623 have first input terminals for receiving a threshold, and have second input terminals respectively coupled to the counters 611~613 to receive the count values. The comparators 621~623 determine whether the count values are greater than the threshold, and if the result is "yes", then logical "1" will be outputted. The OR gate 630 has multiple input terminals respectively coupled to the comparators 621~623. When one of the comparator 621~623 output logical "1", an output terminal of the OR gate 630 outputs the interrupt signal 561 to interrupt the processing unit 510. Note that the recording circuit 560 in FIG. 4 is just an example, and people skilled in the art should be able to design different circuits based of the functions of the recording circuit 560.

Figure 5:
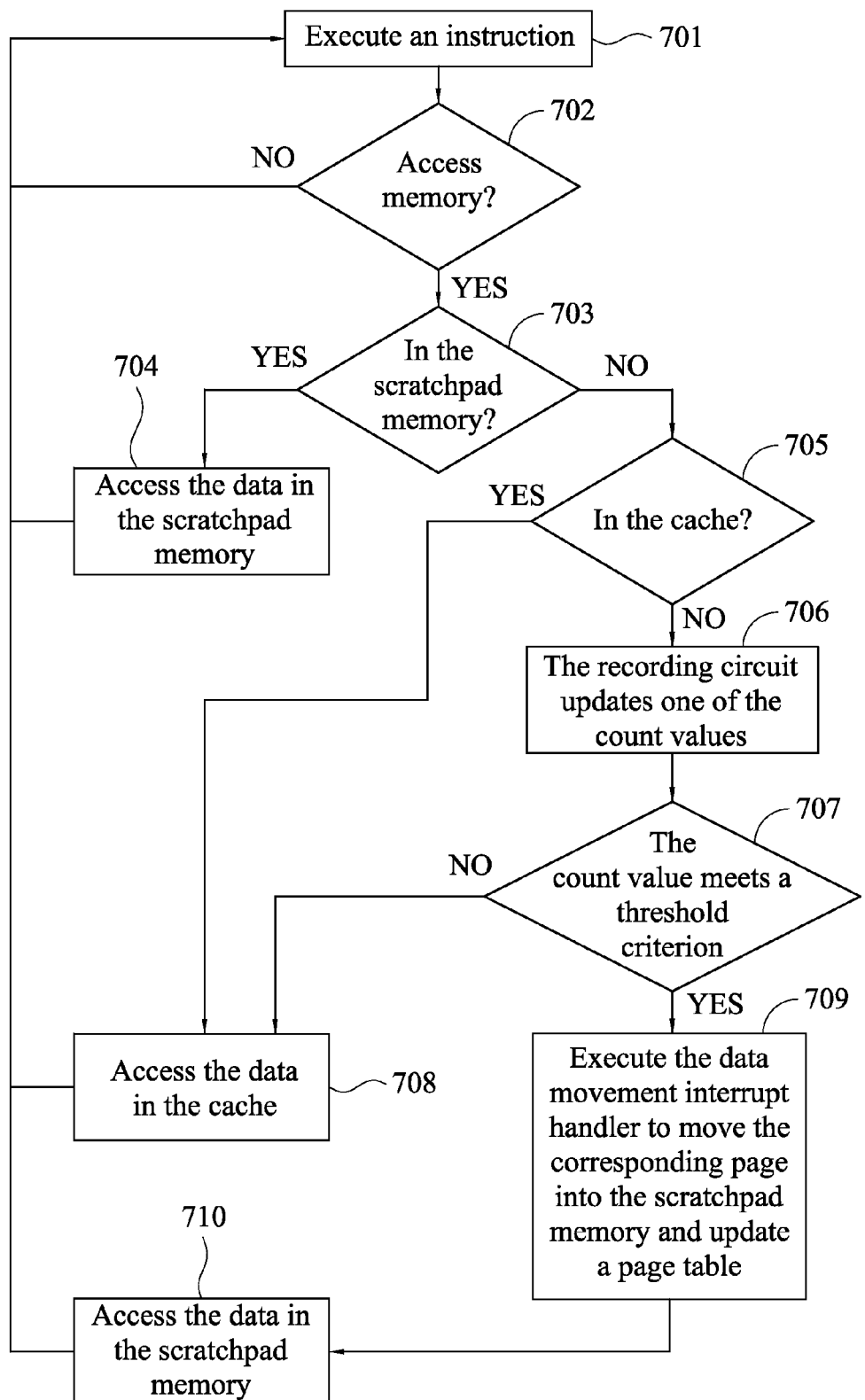
FIG. 5 is a flow chart of data access according to an embodiment.

FIG. 5 is a flow chart of data access according to an embodiment. Referring to FIG. 5, in a step 701, the processing unit 510 executes an instruction. In a step 702, it is determined whether the instruction accesses the memory (e.g. a load or store instruction). If the result of the step 702 is "YES", then a step 703 is performed to determine whether the data to be accessed is in the scratchpad memory 540. If the data is in the scratchpad memory 540, a step 704 is performed to access the data in the scratchpad memory 540. If the result of the step 703 is "NO", then a step 705 is performed to determine whether the data is in the cache 550. If the result of the step 705 is "YES", the data in the cache 550 is accessed (step 708), and otherwise a step 706 is performed, in which the recording circuit 560 updates one of the count values. In a step 707, it is determined whether the count value meets the threshold criterion. If the result of the step 707 is "NO", then the data is moved from the external memory 570 into the cache 550, and the step 708 is performed. If the result of the step 707 is "YES", then the aforementioned data movement interrupt handler 503 is executed to move the corresponding page into the scratchpad memory 540 and a page table will be updated (step 709). In a step 710, the data in the scratchpad memory 540 is accessed.

The data movement interrupt handler 503 is described herein. First, after receiving the interrupt signal 561, the processing unit 510 determines whether the scratchpad memory 540 has a free space. If the scratchpad memory 540 has the free space, then the data of the page (say page P) where the cache miss occurs is moved to the scratchpad memory 540. If the scratchpad memory 540 does not have enough space, then the processing unit 510 selects one page (say page Q) from the scratchpad memory 540, and moves the data in the selected page Q to the external memory, and then moves the data of the page P to the scratchpad memory 540. In the embodiment, the processing unit 510 uses a round-robin policy to select one page in the scratchpad memory 540. However, in other embodiments, the processing unit 510 may use a least recently used policy, a first-in-first-out policy, or other suitable policies, which is not limited in the invention. Last, no matter the scratchpad memory 540 have the free space or not, the page table is updated. To be specific, since the scratchpad memory 540 has its own address space, the physical addresses of the scratchpad memory 540 are not overlapped with the physical addresses of the external memory 570. If the page P is moved to the scratchpad memory 540, and the page Q is moved to the external memory 570, then the page table is modified to reflect the physical address changes of the pages P and Q.

In the embodiment of comparing the count value with the threshold, the value of the threshold affects the movement of the data. For example, if the threshold is relatively small, then the data movement interrupt handler 503 will be executed more frequently. However, different thresholds are required for different programs to reflect the behaviors of the programs. In some embodiments, the processing unit 510 periodically executes the threshold adjustment procedure 504 to adjust the threshold. In detail, the processing unit 510 determines whether there is data moved to the scratchpad memory 540 from a first time point to a second time point or not, and whether the scratchpad memory 540 has a free space. The second time point is a current time point of executing the threshold adjustment procedure 504, and the first time point precedes the second time point. For example, the first time point is a previous time point of executing the threshold adjustment procedure 504. If no data is moved to the scratchpad memory 540 from the first time point to the second time point and the scratchpad memory 540 has the free space, it means that the threshold is set too large. In this case, the processing unit 510 decreases the threshold to allow more pages to be moved into the scratchpad memory 540 in order to improve scratchpad memory 540 utilization.

On the other hand, the processing unit 510 also obtains a current external access number which indicates a number of times (e.g. in units of cache block) of accessing the external memory 570 from the first time point to the second time point. The processing unit 510 also obtains a previous external access number which indicates a number of times of accessing the external memory 570 from a third time point to the first time point, in which the third time point precedes the first time point. The processing unit 510 determines whether the current external access number is less than the previous external access number. If the current external access number is not less than the previous external access number, it means that the previous threshold (i.e. the threshold used when the data movement interrupt handler 503 is previously executed) is better than the current threshold, and therefore the threshold is not changed. In the contrast, if the current external access number is less than the previous external access number, it means the current threshold is better than the previous threshold, and therefore the threshold should be kept on changing. For example, the processing unit 510 may determine whether the current threshold is greater than the previous threshold. If the current threshold is greater than the previous threshold, then the current threshold is increased. If the current threshold is not greater than the previous threshold, then the processing unit 510 decreased the current threshold. Next, all of the count values are reset at the end of the threshold adjustment procedure 504. Note the in the step of the increasing or decreasing the threshold, any operation may be performed on the threshold, and the invention is not limited to the disclosed embodiments.

FIG. 6 is diagram illustrating pseudo codes implementing the threshold adjustment procedure according to an embodiment. Referring to FIG. 6, $MA_{pre}$ denotes a number of times (in units of cache blocks) of accessing the external memory 570 in a previous period (i.e. from the third time point to the first time point). $MA_{cur}$ denotes a number of times of accessing the external memory 570 in the current period (i.e. from the first time point to the second time point). $Th_{pre}$ denotes the threshold (i.e. the previous threshold) used in the previous period. $Th_{cur}$ denotes the threshold used in the current period. $P_{cur}$ denotes the number of pages moved to the scratchpad memory 540 in the current period. $Th_{next}$ denotes the threshold used in a next period.

In the first line of FIG. 6, $MA_{pre}$, $MA_{cur}$, $Th_{cur}$, and $Th_{next}$ are initialized. However, the initial values are just examples, and the invention is not limited thereto. In the line 2, the processing unit 510 is interrupted by a timer triggered once a predetermined period (e.g. 1M cycles) to execute the codes in the lines 3 to 14. In the lines 5 to 6, if $P_{cur}$ is less or equal to 0, and the scratchpad memory (labeled as SPM in FIG. 6) has free space, then the threshold is decreased (e.g. divided by 2). In the line 7, it is determined whether $MA_{cur}$ is less than $MA_{pre}$. In the lines 8 to 9, the threshold is increased (e.g. multiplied by 2) if the current threshold $Th_{cur}$ is greater than the previous threshold $Th_{pre}$; and otherwise, the threshold is decreased (e.g. divided by 2) in the line 11. If $MA_{cur}$ is not less than $MA_{pre}$, the threshold is kept unchanged in the line 13. In the line 14, all the counters are reset (i.e. reset all the count values).

In the embodiment above, the processing unit 510 executes the threshold adjustment procedure 504 once a predetermined period. However, in other embodiments, the processing unit 510 may also executes threshold adjustment procedure 504 irregularly. For example, the processing unit 510 may determine whether a miss rate of the cache 550 is greater than a miss threshold, and executes the threshold adjustment procedure 504 if the result is yes.

Figure 7:
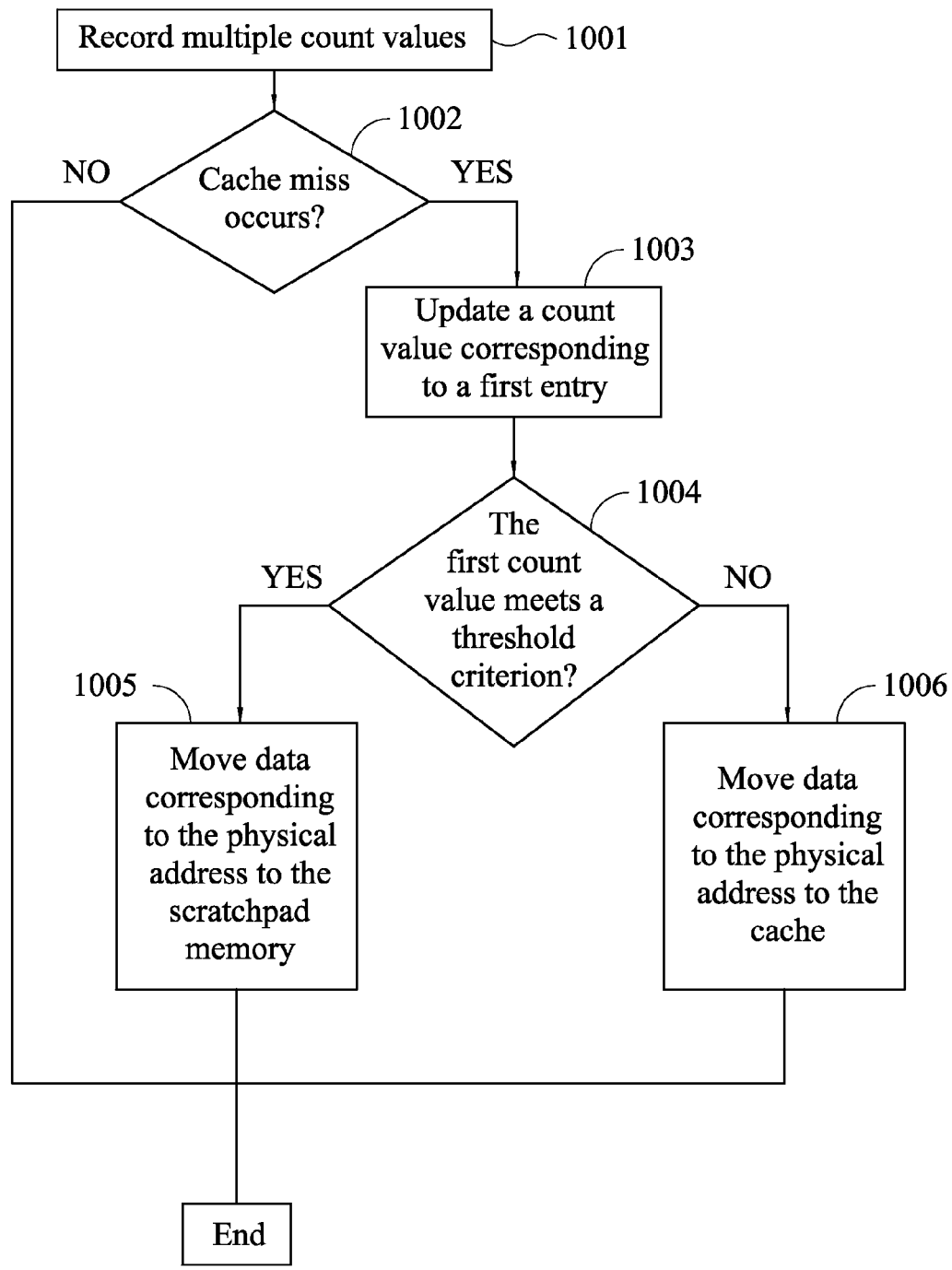
FIG. 7 is a flow chart of a method for managing the scratchpad memory according to an embodiment.

FIG. 7 is a flow chart of a method for managing the scratchpad memory according to an embodiment. Referring to FIG. 7, in a 1001, multiple count values are recorded. In a step 1002, it is determined whether a cache miss occurs. If the result of the step 1002 is "YES" (assume a first entry is matched), a first count value corresponding to the first entry is updated in the step 1003. In a step 1004, it is determined whether the first count value meets a threshold criterion. If the result of the step 1004 is "YES", in a step 1005, the data corresponding to the accessed physical address is moved to the scratchpad memory. If the result of the step 1004 is "NO", in a 1006, the data corresponding to the accessed physical address is moved to the cache. However, each step in FIG. 7 has been described in detail above, and therefore they will not be repeated. Note that each step in FIG. 7 can be implemented as program codes, circuits, or the combination thereof, and the invention is not limited thereto. In addition, the method of FIG. 7 can be performed with the embodiments described above, or performed independently. In other words, other steps may be added between the steps in FIG. 7.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic device, comprising:
a processing unit;
a translation lookaside buffer (TLB) coupled to the processing unit and having a plurality of entries, wherein the TLB receives a virtual address from the processing unit, the virtual address is matched with a first entry of the entries, and the TLB outputs a physical address according to the virtual address and a physical page number recorded in the first entry;
a redirector coupled to the TLB and receiving the physical address;
a scratchpad memory coupled to the redirector;
a cache coupled to the redirector;
an external memory; and
a recording circuit coupled to the TLB, the cache and the processing unit, and recording a plurality of count values, wherein the count values are respectively corresponding to the entries,
wherein the redirector transmits the physical address to the scratchpad memory or the cache,
wherein if a cache miss occurs when the physical address is transmitted to the cache, the recording circuit updates a first count value of the count values corresponding to the first entry, and determines whether the first count value meets a threshold criterion,
if the first count value meets the threshold criterion, the recording circuit transmits an interrupt signal to the processing unit, and the processing unit moves data corresponding to the physical address to the scratchpad memory, if the first count value does not meet the threshold criterion, the data corresponding to the physical address is moved to the cache,
wherein the operation of the recording circuit determining whether the first count value meets the threshold criterion comprises:
the recording circuit determines whether the first count value is greater than a threshold; and
if the first count value is greater than the threshold, the recording circuit determines that the first count value meets the threshold criterion,
wherein the processing unit is further configured to execute a threshold adjustment procedure, and the threshold adjustment procedure comprises:
determining whether there is data moved to the scratchpad memory from a first time point to a second time point or not, and whether the scratchpad memory has a free space; and
decreasing the threshold if no data is moved to the scratchpad memory from the first time point to the second time point and the scratchpad memory has the free space,
wherein if the cache miss occurs when the physical address is transmitted to the cache, the processing unit obtains the data corresponding to the physical address from the external memory, and the threshold adjustment procedure further comprises:
obtaining a current external access number which indicates a number of times of accessing the external memory from the first time point to the second time point;
obtaining a previous external access number which indicates a number of times of accessing the external memory from a third time point to the first time point, wherein the third time point precedes the first time point;
determining whether the current external access number is less than the previous external access number;
keeping the threshold unchanged if the current external access number is not less than the previous external access number; and
resetting the count values.

2. The electronic device of claim 1, wherein the recording circuit comprises:
a plurality of AND gates, wherein a first input terminal of each of the AND gates is coupled to one of the entries, and a second input terminal of each of the AND gates receives a cache miss signal from the cache,
a plurality of counters respectively coupled to output terminals of the AND gates, and recording the count values;
a plurality of comparators, wherein a first input terminal of each of the comparators receives a threshold, and a second input terminal of each of the comparators is coupled to one of the counters;
an OR gate, having a plurality of input terminal respectively coupled to output terminals of the comparators, and an output terminal outputting the interrupt signal.

3. The electronic device of claim 1, wherein the threshold adjustment procedure further comprises:
determining whether the threshold is greater than a previous threshold if the current external access number is less than the previous external access number;
increasing the threshold if the threshold is greater than the previous threshold; and
decreasing the threshold if the threshold is not greater than the previous threshold.

4. The electronic device of claim 1, wherein the processing unit executes the threshold adjustment procedure once a predetermined period.

5. The electronic device of claim 1, wherein when a context switch occurs in the processing unit, the recording circuit resets the count values.

6. The electronic device of claim 1, wherein the size of the data corresponding to the physical address is the same as the size of a page when the data corresponding to the physical address is moved to the scratchpad memory.

7. A method for managing an electronic device comprising a processing unit, a translation lookaside buffer (TLB), a redirector, a scratchpad memory and a cache, wherein the TLB has a plurality of entries, and a virtual address from the processing unit is matched with a first entry of the entries, and the TLB outputs a physical address according to the virtual address and a physical page number recorded in the first entry, and the redirector transmits the physical address to the scratchpad memory or the cache, and the method comprises:

recording a plurality of count values which are respectively corresponding to the entries;

if a cache miss occurs when the physical address is transmitted to the cache, updating a first count value of the count values corresponding to the first entry, and determining whether the first count value meets a threshold criterion, wherein the determining whether the first count value meets the threshold criterion comprises:

determining whether the first count value is greater than a threshold; and if the first count value is greater than the threshold, determining that the first count value meets the threshold criterion;

moving data corresponding to the physical address to the scratchpad memory if the first count value meets the threshold criterion;

moving the data corresponding to the physical address to the cache if the first count value does not meet the threshold criterion;

executing a threshold adjustment procedure, wherein the threshold adjustment procedure comprises:

determining whether there is data moved to the scratchpad memory from a first time point to a second time point or not, and whether the scratchpad memory has a free space; and decreasing the threshold if no data is moved to the scratchpad memory from the first time point to the second time point and the scratchpad memory has the free space; and if the cache miss occurs when the physical address is transmitted to the cache, obtaining the data corresponding to the physical address from an external memory, wherein the threshold adjustment procedure further comprises:

obtaining a current external access number which indicates a number of times of accessing the external memory from the first time point to the second time point;

obtaining a previous external access number which indicates a number of times of accessing the external memory from a third time point to the first time point, wherein the third time point precedes the first time point;

determining whether the current external access number is less than the previous external access number;

keeping the threshold unchanged if the current external access number is not less than the previous external access number; and resetting the count values.

* * * * *